United States Patent [19]

Lee

[11] Patent Number: 5,445,991
[45] Date of Patent: Aug. 29, 1995

[54] METHOD FOR FABRICATING A SEMICONDUCTOR DEVICE USING A POROUS SILICON REGION

[75] Inventor: Jong H. Lee, Taegu, Rep. of Korea

[73] Assignees: Kyungdook National University Sensor Technology. Research Center, Taegu; Mando Machinery Corporation, Kyungki-do, both of Rep. of Korea; a part interest

[21] Appl. No.: 371,271

[22] Filed: Dec. 23, 1994

[30] Foreign Application Priority Data

Dec. 24, 1993 [KR] Rep. of Korea .................... 93-29499

[51] Int. Cl.$^6$ ............................................ H01L 21/20
[52] U.S. Cl. ...................................................... 216/2
[58] Field of Search .................... 437/81, 238, 901; 156/628

[56] References Cited

U.S. PATENT DOCUMENTS 3,976,511 8/1976 Johnson ................................ 156/628
5,380,373 1/1995 Kimura et al. ....................... 437/228

FOREIGN PATENT DOCUMENTS 250865 10/1988 Japan .................................... 437/901
49267 3/1991 Japan .................................... 437/901

OTHER PUBLICATIONS

M. Hirata et al., "Silicon diaphragm pressure sensors fabricated by anodic oxidation etch-stop," Send. Actuators (Switzerland), vol. 13, No. 13, pp. 63–70, Jan. 1988.

X. G. Zhang, et al., "Porous silicon formation and electropolishing of silicon by anodic polarization in HF solution," J. Electrochem. Soc., vol. 136, No. 5, pp. 1561–1565, May 1989.

*Primary Examiner*—R. Bruce Breneman
*Assistant Examiner*—Linda J. Fleck
*Attorney, Agent, or Firm*—Irving Keschner

[57] ABSTRACT

A method for fabricating a silicon diaphragm comprises the steps of preparing an n-type silicon substrate; diffusing n+ impurities in the silicon substrate to form an n+ diffusion region in a part of the upper wall thereof; growing an n-type silicon epitaxial layer thereon; forming a through-hole in the n-type silicon epitaxial layer to expose a part of the n+ diffusion region; performing an anodic reaction in an HF solution to make the n+ diffusion region a porous silicon layer; etching the porous silicon layer to form an air-gap; and, sealing the through-hole.

2 Claims, 4 Drawing Sheets

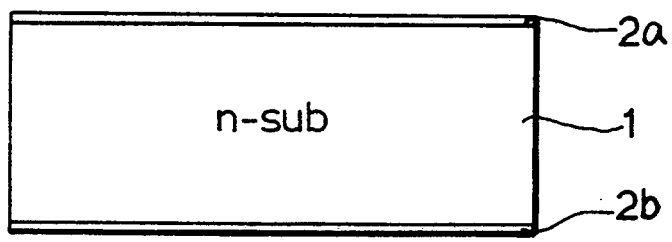
FIG. IA
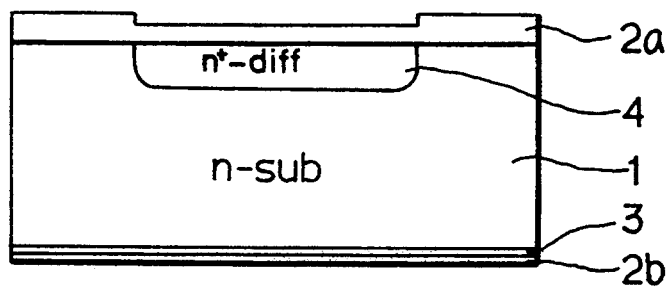
FIG. IB
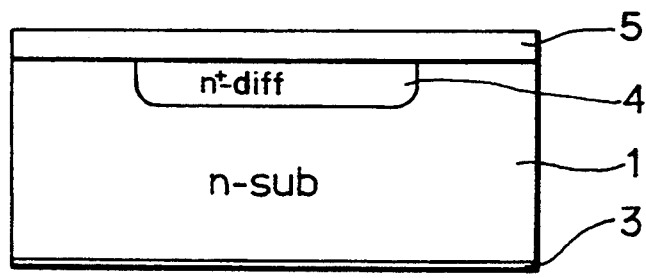
FIG. IC
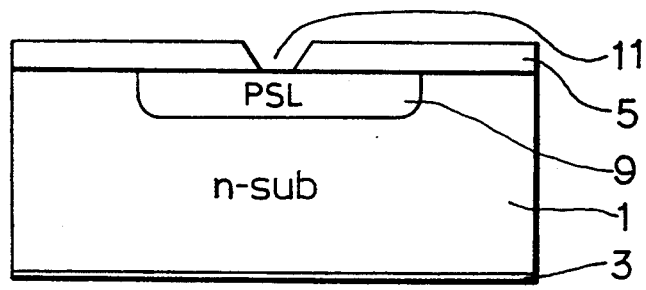
FIG. ID

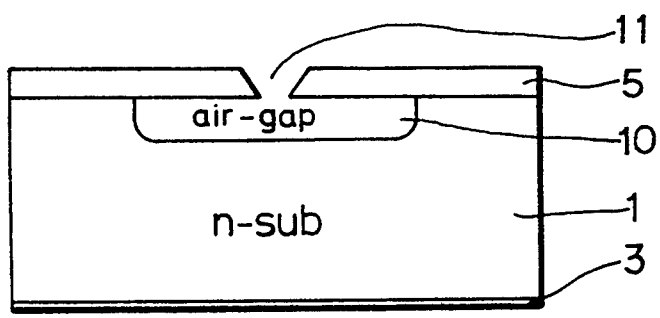
FIG. IE
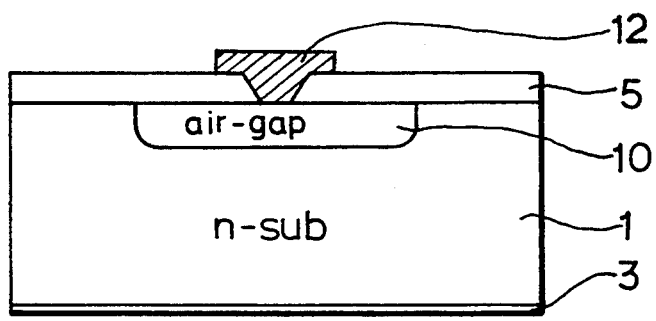
FIG. IF

METHOD FOR FABRICATING A SEMICONDUCTOR DEVICE USING A POROUS SILICON REGION

BACKGROUND OF THE INVENTION

1. Field of the Invention

The present invention relates to a method for fabricating a semiconductor device used in the fabrication of a pressure sensor, acceleration sensor, vibration sensor or the like, and particularly to a method for fabricating a mono-crystalline silicon diaphragm or pressure sensor into various shapes such as a circle, triangle, spiral or the like using a porous silicon, regardless of the type of substrate, and a crystalline orientation of the substrate.

2. Description of the Prior Art

Conventionally, a mono-crystalline silicon diaphragm is fabricated by either isotropically or anisotropically etching the backside of the substrate.

The isotropic etching process has the advantage in that the diaphragm may be fabricated into various shapes, but it cannot be used in practice as it creates undesirable side etch phenomenon.

On the other hand, when the anisotropic etching process is used in the fabrication the diaphragm, undesirable side etch phenomenon can be prevented because the (111) crystalline plane of the substrate, which is not etched, lies in the side surface thereof. However, the anisotropic etching process still has the disadvantage in that it cannot be fabricated into a quadrilateral shape. This is because the shape of the diaphragm is defined according to the crystalline orientation of the substrate.

SUMMARY OF THE INVENTION

This invention is invented to overcome the afore-mentioned disadvantages found in the conventional method of fabricating a diaphragm or pressure sensor, and thus an object of the present invention is to provide a method for precisely fabricating a diaphragm or pressure sensor with various shapes regardless of the crystalline orientation of the substrate.

To achieve the afore-mentioned object, a method for fabricating a silicon diaphragm according to the present invention comprises the steps of preparing an n-type silicon substrate; diffusing $n^+$ impurities in the silicon substrate to form an $n^+$ diffusion region in a part of the upper wall thereof; growing an n-type silicon epitaxial layer thereon; forming a through-hole in the n-type silicon epitaxial layer to expose a part of the $n^+$ diffusion region; performing anodic reaction in an HF solution to make the $n^+$ diffusion region a porous silicon layer; etching the porous silicon layer to form an air-gap; and, sealing the through-hole.

On the other hand, a method for fabricating a pressure sensor according to the present invention comprises the steps of preparing an n-type silicon substrate;- diffusing $n^+$ impurities in the silicon substrate to form an $n^+$ diffusion region in a part of the upper wall thereof; growing an n-type silicon epitaxial layer thereon; forming a plurality of piezo-resistors in the n-type silicon epitaxial layer; forming a Ni/Cr/Au metallic layer on the n-type silicon epitaxial layer using an evaporation process; forming a through-hole in the Ni/Cr/Au metallic and n-type silicon epitaxial layer to expose a part of the $n^+$ diffusion region; performing anodic reaction in an HF solution to make the $n^+$ diffusion region a porous silicon layer; patterning the Ni/Cr/Au metallic layer; etching the porous silicon layer to form an air-gap; and, sealing the through-hole.

BRIEF DESCRIPTION OF THE ACCOMPANYING DRAWING

These and other aspects of the present invention are clarified in the accompanying drawings in which:

FIGS. 1(A) through (F) are cross sectional views showing the manufacturing process of a silicon diaphragm according to the present invention; and, FIGS. 2(A) through (G) are cross sectional views showing the manufacturing process of a silicon pressure sensor according to the present invention.

DETAILED DESCRIPTION OF THE PREFERRED EMBODIMENT

Figure 2A:
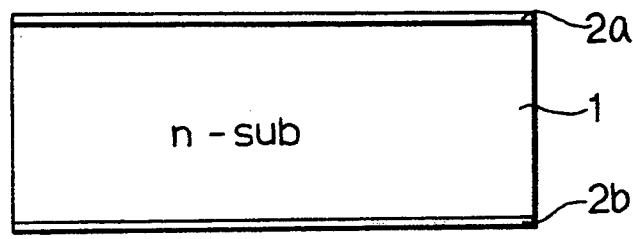

For a better understanding of the present invention, together with other and further objects, advantages and capabilities thereof, reference is made to the following disclosure and appended claim in connection with the above-described drawing.

To begin, the method for fabricating a silicon pressure sensor will be explained in detail.

Referring to FIG. 1(A), an n-type silicon substrate 1 is prepared and then initially cleaned by a standard process. Next, the silicon oxide layers 2a and 2b with a thickness of 4,500 Å–5,000 Å are grown on the top and bottom walls of the silicon substrate 1.

Referring to FIG. 1(B), a diffusion window is opened in the silicon oxide layer 2a lying on the top wall of the silicon substrate 1 by a photolithographic process to define a porous silicon region to be subsequently explained, and an $n^+$ diffusion region 4, with a length of 5 $\mu$m–25 $\mu$m, is formed in a part of the upper wall of the silicon substrate 1 by using a $POCl_3$ solution as an n-type impurities source. At this time, another $n^+$ layer 3 is inevitably formed on the bottom wall of the silicon substrate 1. The $n^+$ layer 3 is useful in an anodic reaction to be subsequently explained, but it is not necessary for the construction of the present invention.

Referring to FIG. 1(C), the silicon oxide layer 2a lying on the top wall of the silicon substrate 1 is removed, and then an n-type silicon epitaxial layer 5, with a resistivity of 50 cm–150 cm, is grown with a thickness of 3 $\mu$m–10 $\mu$m thereon.

Referring to FIG. 1(D), a through-hole 11 for the anodic reaction is formed by an etching process to expose the $n^+$ diffusion region 4. Next, the anodic reaction is performed in an HF solution, with 5–48 wt % for a predetermined time interval, by applying voltage of 2V–5V to the wafer, so that a porous silicon layer 9 is made from the $n^+$ diffusion region 4.

Referring to FIG. (E), the porous silicon layer 9 is selectively etched, the wafer is cleaned with deionized water, and then a precise air-gap 10 is formed using a thermal vacuum dry process.

Referring to FIG. (F), the through-hole 11 is sealed with a sealing material 12 such as a polymer, metal paste, silicon-on glass, or the like.

As described above, a silicon diaphragm which has various shapes may be precisely fabricated regardless of the crystalline orientation of the substrate.

Hereinafter, the full process for fabricating a silicon pressure sensor, in which the process for fabricating a silicon diaphragm is included, will now be explained in detail.

Figure 2B:
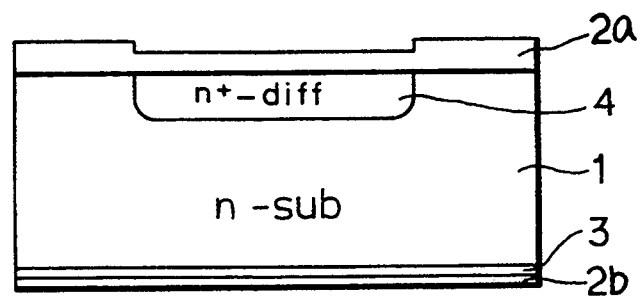
Figure 2C:
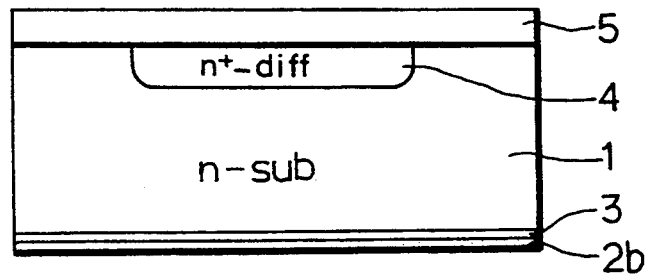

By the way, the processes responding to FIGS. 2(A) through (C) will be omitted since they are same as that of FIGS. 1(A) through (C).

Figure 2D:
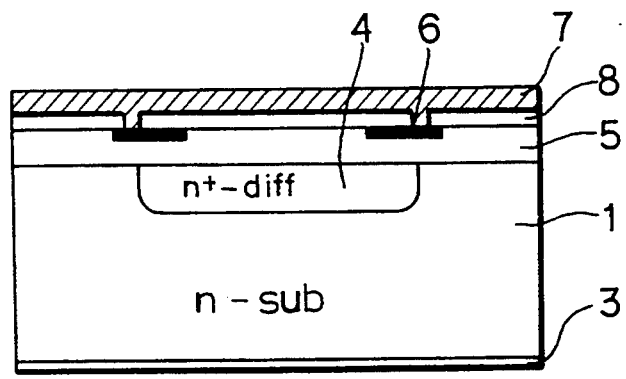

Referring to FIG. 2(D), a silicon oxide layer 8 is grown on the n-type silicon epitaxial layer 5, diffusion windows are opened in the silicon oxide layer 8 by a photolithographic technique, and a plurality of p-type piezo-resistors 6 are formed on the n-type silicon epitaxial layer 5 using a thermal diffusion or ion implantation process. Next, a Ni/Cr/Au metallic layer 7 is formed by an evaporation process on the silicon oxide layer 8, and then treated by heat. Here, the Ni/Cr/Au metallic layer 7 plays a role of both a metal pad and a protection layer for the elements related to the anodic reaction.

Figure 2E:
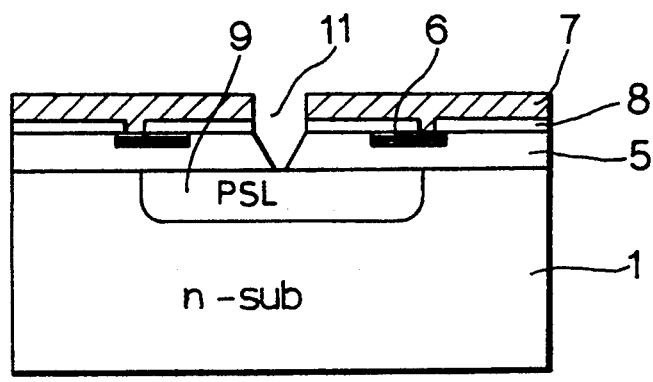

Referring to FIG. 2(E), a through-hole 11 for the anodic reaction is formed by an etching process to expose the n+ diffusion region 4. Next, the anodic reaction is performed in an HF solution, with 5-48 wt % for a predetermined time interval, by applying voltage of 2V-5V to the wafer, so that a porous silicon layer 9 is made from the n+ diffusion region 4.

Figure 2F:
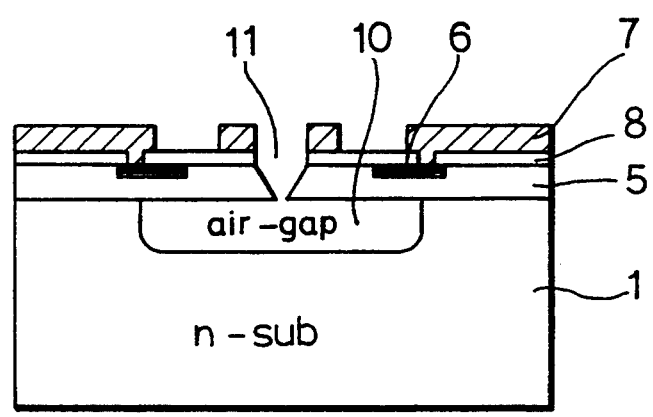

Referring to FIG. 2(F), the metallic layer 7 is patterned to form conducting wires, and then the porous silicon layer 9 is selectively etched. Next, the wafer is cleaned with deionized water, and then a precise air-gap 10 is formed using a thermal vacuum dry process.

Figure 2G:
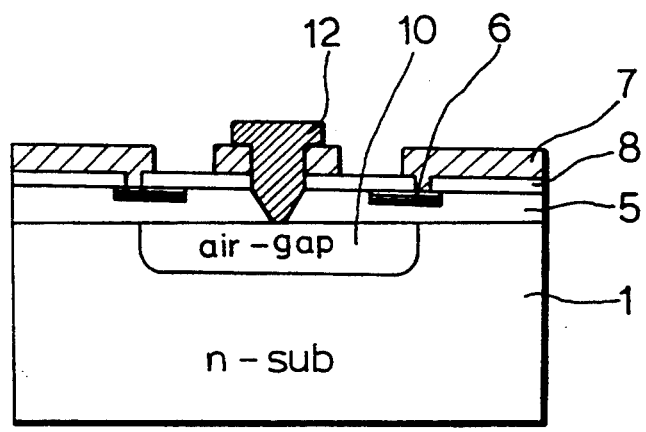

Referring to FIG. 2(G), the through-hole 11 is sealed with sealing material 12 such as a polymer, metal paste, SOG or the like.

As described above, a silicon pressure sensor, which requires various shapes, may be precisely fabricated regardless of the crystalline orientation of the substrate.

In the silicon pressure sensor, when pressure higher than that within the air gap 10 is applied to the diaphragm, the diaphragm get bent, thereby causing the correspondent stress to be applied to the piezo-resistors 6. When the stress is applied to the piezo-resistors 6, the resistance across the piezo-resistor 6 is varied. As a result, the pressure may be precisely measured by detecting the resistance using the metallic layer 7 as a conducting wire. Not to mention, the pressure sensor according to the present invention may be adapted to a tactile sensor.

Furthermore, if the weight of the sealing material 12 is heavier at the step of sealing the through-hole 11 so that it may act as a mass portion, then it is possible to fabricate an acceleration sensor or a vibration sensor.

We claim:

1. A method for manufacturing a silicon diaphragm using a porous silicon, the method comprising the steps of:

preparing an n-type silicon substrate;
diffusing n+ impurities in the silicon substrate to form an n+ diffusion region in a part of the upper wall thereof;
growing an n-type silicon epitaxial layer thereon;
forming a through-hole in the n-type silicon epitaxial layer to expose a part of the n+ diffusion region;
performing an anodic reaction in an HF solution to make the n+ diffusion region a porous silicon layer;
etching the porous silicon layer to form an air-gap; and,
sealing the through-hole.

2. A method for manufacturing a silicon pressure sensor using a porous silicon, the method comprising the steps of:

preparing an n-type silicon substrate;
diffusing n+ impurities in the silicon substrate to form an n+ diffusion region in a part of the upper wall thereof;
growing an n-type silicon epitaxial layer thereon;
forming a piezo-resistor in the n-type silicon epitaxial layer;
forming a Ni/Cr/Au metallic layer on the n-type silicon epitaxial layer using an evaporating process;
forming a through-hole in the Ni/Cr/Au metallic and n-type silicon epitaxial layer to expose a part of the n+ diffusion region;
performing an anodic reaction in an HF solution to make the n+ diffusion region a porous silicon layer;
patterning the Ni/Cr/Au metallic layer;
etching the porous silicon layer to form an air-gap; and,
sealing the through-hole.

* * * * *